United States Patent
Rosenberg et al.

(10) Patent No.: US 12,400,638 B2
(45) Date of Patent: Aug. 26, 2025

(54) USING ALIGNED TEXT AND SPEECH REPRESENTATIONS TO TRAIN AUTOMATIC SPEECH RECOGNITION MODELS WITHOUT TRANSCRIBED SPEECH DATA

(71) Applicant: Google LLC, Mountain View, CA (US)

(72) Inventors: Andrew Rosenberg, Brooklyn, NY (US); Zhehuai Chen, Edgewater, NJ (US); Ankur Bapna, Sunnyvale, CA (US); Yu Zhang, Mountain View, CA (US); Bhuvana Ramabhadran, Mt. Kisco, NY (US)

(73) Assignee: Google LLC, Mountain View, CA (US)

( * ) Notice: Subject to any disclaimer, the term of this patent is extended or adjusted under 35 U.S.C. 154(b) by 241 days.

(21) Appl. No.: 18/355,508

(22) Filed: Jul. 20, 2023

(65) Prior Publication Data

US 2024/0029715 A1     Jan. 25, 2024

Related U.S. Application Data

(60) Provisional application No. 63/369,213, filed on Jul. 22, 2022.

(51) Int. Cl.
  *G10L 15/06* (2013.01)
(52) U.S. Cl.
  CPC .................. *G10L 15/063* (2013.01)
(58) Field of Classification Search
  CPC ....... G10L 15/063; G10L 15/16; G10L 13/08; G10L 15/26; G06N 3/044
  See application file for complete search history.

(56) References Cited

U.S. PATENT DOCUMENTS

2020/0342852 A1* 10/2020 Kim .................. G06F 40/40
2021/0183373 A1*  6/2021 Moritz ................ G06N 3/045

(Continued)

FOREIGN PATENT DOCUMENTS

WO    2023/183680 A1    9/2023

OTHER PUBLICATIONS

Wenxin Hou et al. "Exploiting Adapters for Cross-lingual Low-resource Speech Recognition", ARXIV.ORG., Cornell University Library, Ithaca, NY 14853, May 18, 2021.

(Continued)

*Primary Examiner* — Michael Colucci
(74) *Attorney, Agent, or Firm* — Honigman LLP; Brett A. Krueger; Grant Griffith

(57) ABSTRACT

A method includes receiving training data that includes unspoken textual utterances in a target language. Each unspoken textual utterance not paired with any corresponding spoken utterance of non-synthetic speech. The method also includes generating a corresponding alignment output for each unspoken textual utterance using an alignment model trained on transcribed speech utterance in one or more training languages each different than the target language. The method also includes generating a corresponding encoded textual representation for each alignment output using a text encoder and training a speech recognition model on the encoded textual representations generated for the alignment outputs. Training the speech recognition model teaches the speech recognition model to learn how to recognize speech in the target language.

24 Claims, 10 Drawing Sheets

(56) References Cited

U.S. PATENT DOCUMENTS

| | | | | |
|---|---|---|---|---|
| 2021/0350786 A1* | 11/2021 | Chen | .................. | G10L 13/08 |
| 2022/0230628 A1* | 7/2022 | Zhu | .................. | G10L 15/063 |
| 2023/0169281 A1* | 6/2023 | Zheng | .................. | G10L 15/28 |
| | | | | 704/2 |
| 2023/0223018 A1* | 7/2023 | Xing | .................. | G10L 15/22 |
| | | | | 704/232 |
| 2023/0343319 A1* | 10/2023 | Hu | .................. | G06N 3/0442 |

OTHER PUBLICATIONS

Wang Wei et al., "Optimizing Alignment of Speech and Language Latent Spaces for End-To-End Speec Recognition and Understanding", ICASSP 2022-2022 IEEE International Conference on Acoustics, Speech and Signal Processing, May 23, 2022.

Zhehuai Chen et al., "MAESTRO: Matched Speech Text Representations through Modality Matching", ARXIV.ORG, Cornell University Library, Ithaca, NY 14853, Apr. 7, 2022.

International Search Report and Written Opinion, Application No. PCT/US2023/028267, mailed Nov. 7, 2023.

\* cited by examiner

USING ALIGNED TEXT AND SPEECH REPRESENTATIONS TO TRAIN AUTOMATIC SPEECH RECOGNITION MODELS WITHOUT TRANSCRIBED SPEECH DATA

CROSS REFERENCE TO RELATED APPLICATIONS

This U.S. patent application claims priority under 35 U.S.C. § 119(e) to U.S. Provisional Application 63/369,213, filed on Jul. 22, 2022. The disclosure of this prior application is considered part of the disclosure of this application and is hereby incorporated by reference in its entirety.

TECHNICAL FIELD

This disclosure relates to using aligned text and speech representations to train automatic speech recognition models without transcribed speech data.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g. a low word error rate (WER)) and latency (e.g., delay between the user speaking and the transcription) based on the ongoing development of deep neural networks. However, one challenge in developing deep learning-based ASR models is a substation amount of transcribed speech is required during training. In some instances, unspoken text data is used to train the ASR models to supplement a small set of transcribed speech training data. Yet, this challenge is further complicated when training ASR models with low-resource languages that include zero available transcribed speech training data.

SUMMARY

One aspect of the disclosure provides a computer-implemented method that when executed on data processing hardware causes the data processing hardware to perform operations for using aligned text and speech representations to train automatic speech recognition models without transcribed speech data. The operations include receiving training data that includes unspoken textual utterances in a target language. Each unspoken textual utterance not paired with any corresponding spoken utterance of non-synthetic speech. The operations also include generating a corresponding alignment output for each unspoken textual utterance of the received training data using an alignment model trained on transcribed speech utterances in one or more training languages each different than the target language. The operations also include generating a corresponding encoded textual representation for each alignment output using a text encoder. The operations also include training a speech recognition model on the encoded textual representations generated for the alignment outputs corresponding to the unspoken textual utterances in the target language to teach the speech recognition model to learn how to recognize speech in the target language.

Implementations of the disclosure may include one or more of the following optional features. In some implementations, training the speech recognition model includes training the speech recognition model without using any transcribed speech utterances in the target language for supervised learning. In some examples, the speech recognition model includes an audio encoder and a decoder. The decoder may include a recurrent neural network transducer (RNN-T) architecture. In these examples, the audio encoder includes the text encoder, a speech encoder, and a shared encoder. Here, the encoder may include a plurality of multi-headed self-attention layers. The audio encoder may include a Conformer encoder. In these examples, the operations further include conditioning at least one of the audio encoder or the decoder on a language identifier uniquely identifying the target language. Conditioning the at least one of the audio encoder or the decoder includes conditioning the at least one of the audio encoder or the decoder on the language identifier using residual adaptor layers. The alignment model may be trained on transcribed speech utterances in one or more training languages different than the target language.

In some implementations training the speech recognition model includes: generating, using a shared encoder, a first encoded shared representation of the alignment output in a shared latent representation space for each alignment output; for each transcribed speech utterance in the one or more training languages, determining an encoded audio representation of the transcribed speech utterance using a speech encoder and generating a second encoded shared representation of the transcribed speech utterance in the shared latent representation space. Here, training the speech recognition model includes training the speech recognition model on the first encoded shared representations generated for the alignment outputs corresponding to the unspoken textual utterances in the target language and the second encoded shared representation generated for the transcribed speech utterances in the one or more training languages. Each unspoken textual utterance may include a sequence of words, wordpieces, graphemes, and/or phonemes. In some examples, the operations further include converting a script of the unspoken textual utterances in the target language into a phonetic representation shared across multiple languages using a pronunciation model.

Another aspect of the disclosure provides a system that includes data processing hardware and memory hardware storing instructions that when executed on the data processing hardware causes the data processing hardware to perform operations. The operations include receiving training data that includes unspoken textual utterances in a target language. Each unspoken textual utterance not paired with any corresponding spoken utterance of non-synthetic speech. The operations also include generating a corresponding alignment output for each unspoken textual utterance of the received training data using an alignment model trained on transcribed speech utterances in one or more training languages each different than the target language. The operations also include generating a corresponding encoded textual representation for each alignment output using a text encoder. The operations also include training a speech recognition model on the encoded textual representations generated for the alignment outputs corresponding to the unspoken textual utterances in the target language to teach the speech recognition model to learn how to recognize speech in the target language.

Implementations of the disclosure may include one or more of the following optional features. In some implementations, training the speech recognition model includes training the speech recognition model without using any transcribed speech utterances in the target language for supervised learning. In some examples, the speech recognition model includes an audio encoder and a decoder. The decoder may include a recurrent neural network transducer (RNN-T) architecture. In these examples, the audio encoder includes the text encoder, a speech encoder, and a shared encoder. Here, the encoder may include a plurality of multi-headed self-attention layers. The audio encoder may include a Conformer encoder. In these examples, the operations further include conditioning at least one of the audio encoder or the decoder on a language identifier uniquely identifying the target language. Conditioning the at least one of the audio encoder or the decoder includes conditioning the at least one of the audio encoder or the decoder on the language identifier using residual adaptor layers. The alignment model may be trained on transcribed speech utterances in one or more training languages different than the target language.

In some implementations training the speech recognition model includes: generating, using a shared encoder, a first encoded shared representation of the alignment output in a shared latent representation space for each alignment output; for each transcribed speech utterance in the one or more training languages, determining an encoded audio representation of the transcribed speech utterance using a speech encoder and generating a second encoded shared representation of the transcribed speech utterance in the shared latent representation space. Here, training the speech recognition model includes training the speech recognition model on the first encoded shared representations generated for the alignment outputs corresponding to the unspoken textual utterances in the target language and the second encoded shared representation generated for the transcribed speech utterances in the one or more training languages. Each unspoken textual utterance may include a sequence of words, wordpieces, graphemes, and/or phonemes. In some examples, the operations further include converting a script of the unspoken textual utterances in the target language into a phonetic representation shared across multiple languages using a pronunciation model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Training state-of-the-art automated speech recognition (ASR) models typically requires a substantial amount of labeled training data including speech utterances each paired with a corresponding transcription (i.e., ground-truth label). Obtaining the substantial amount of labeled training data can be very costly, especially for low-resource languages. Thus, recent approaches for training ASR models include self-supervised training using large amounts of unlabeled training data (i.e., speech not paired with any corresponding transcriptions and/or unspoken text not paired with any corresponding speech) to complement a relatively small amount of labeled training data. However, these approaches still require some small amount of labeled training data in a particular language the ASR model is being trained to recognize. Yet, in some instances, there is zero available labeled training data for certain low-resource languages. As such, in these instances, there is not any labeled training data to complement the large amounts of unlabeled training data.

Accordingly, implementations herein are directed towards methods and systems of using aligned text and speech representation to train ASR models without transcribed speech training data. In particular, training the ASR model includes receiving training data that includes unspoken textual utterances in a target language where each unspoken textual utterance is not paired with any corresponding utterance of non-synthetic (or synthetic) speech. An alignment model generates a corresponding alignment output (i.e., aligned text representation) for each unspoken textual utterance of the received training data. Notably, the alignment model is trained on transcribed (i.e., labeled) speech utterances in one or more training languages each of which is different than the target language the ASR model is trained to recognize. Moreover, a text encoder generates a corresponding encoded textual representation for each alignment output. Thereafter, the ASR model is trained on the encoded textual representations generated for the alignment outputs corresponding to the unspoken textual utterances in the target language to teach the ASR model to learn how to recognize speech in the target language when no labeled training data in the target language is available. That is, the ASR model is trained without using any transcribed speech utterances in the target language for supervised learning.

Figure 1:
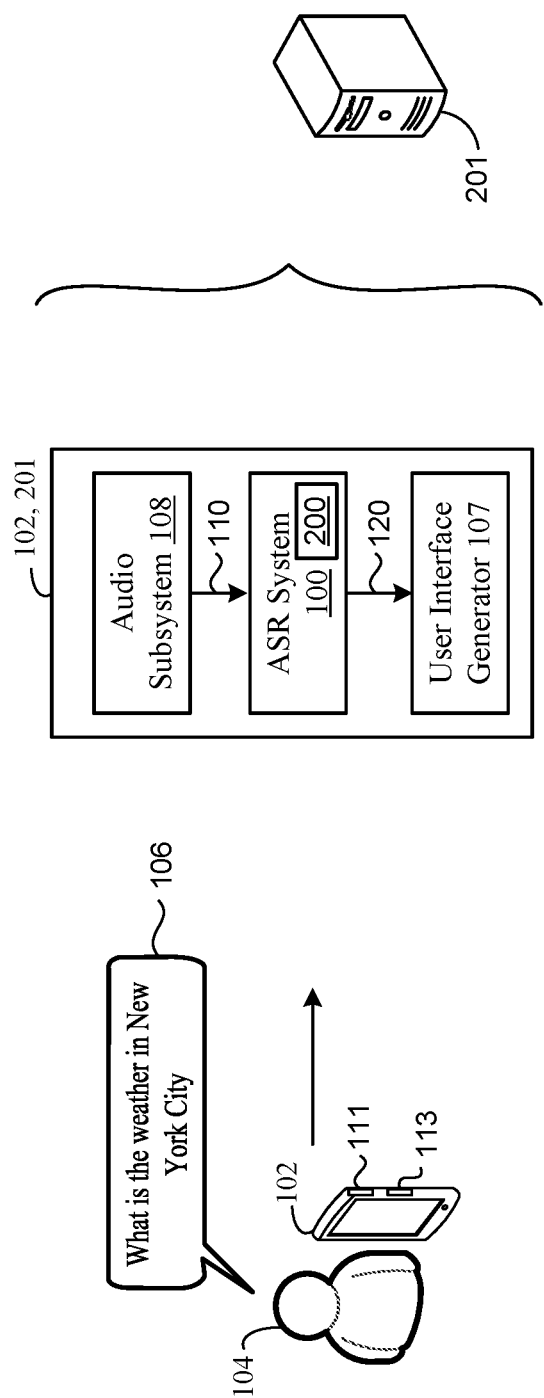
FIG. 1 is a schematic view of an example speech recognition system.

FIG. 1 illustrates an ASR system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware and memory hardware 113.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with input acoustic frames 110 capable of being processed by the ASR system 100. In the example shown, the user speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

The ASR model 200 may operate in a streaming fashion, a non-streaming fashion, or some combination thereof. The ASR model 200 operates in the streaming fashion by, while receiving the sequence of acoustic frames 110, encoding the sequence of acoustic frames 110 and then decoding the encoded sequence of acoustic frames 110 into an initial transcription (e.g., speech recognition result/hypothesis) 120. Thus, the initial transcription 120 may correspond to words, word pieces, and/or individual characters generated by the ASR model 200 as soon as they are spoken. On the other hand, the ASR model 200 operates in the non-streaming fashion by receiving and processing additional right-context to improve upon the initial transcription 120 thereby generating a final transcription 120. That is, the ASR model 200 processes additional input audio data or encoded acoustic frames (e.g., right-context) to improve the transcription 120 output by the ASR model 200, but at increased latency.

Figure 2:
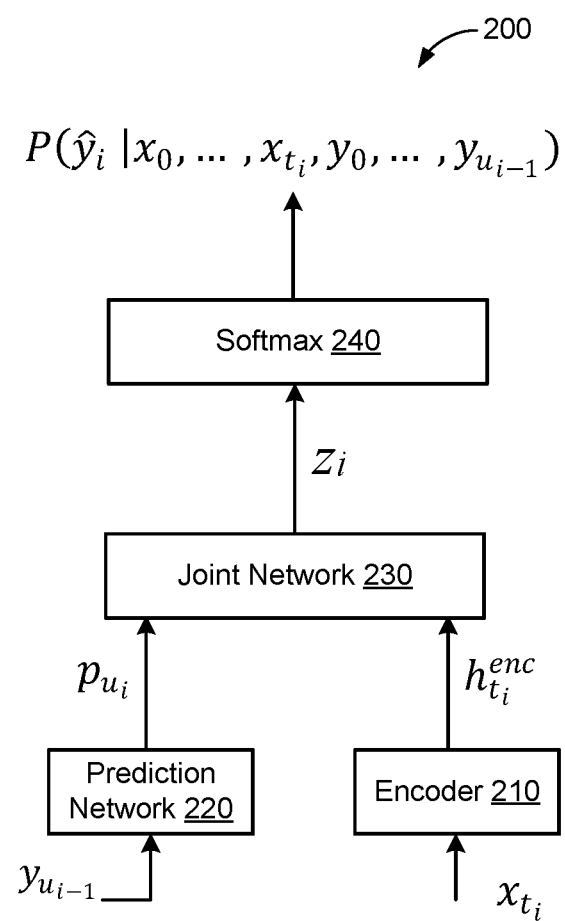
FIG. 2 is a schematic view of an example speech recognition model.

Referring to FIG. 2, an example ASR model 200 may include a Recurrent Neural Network-Transducer (RNN-T) model architecture which adheres to latency constraints with interactive applications. The use of the RNN-T model architecture is exemplary only, as the ASR model 200 may include other architectures such as transformer-transducer and conformer-transducer model architectures among others. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, the encoder network (e.g., audio encoder) 210 reads a sequence of d-dimensional feature vectors (e.g., acoustic frames 110 (FIG. 1)) $x=(x_1, x_2, \ldots, x_T)$, where $x_t \in \mathbb{R}^d$, and produces at each output step a higher-order feature representation. This higher-order feature representation is denoted as $h_1^{enc}, \ldots, h_T^{enc}$. In some examples, the encoder network 210 includes a dual encoder framework that has a text encoder 202 and a speech encoder 204 (FIGS. 3B and 3C).

Similarly, the prediction network 220 is also an LSTM network, which, like a language model (LM), processes the sequence of non-blank symbols output by a final Softmax layer 240 so far, $y_0, \ldots, y_{ui-1}$, into a dense representation Putt. Together, the prediction network 220 and the joint network 230 may be referred to as a decoder that includes an RNN-T architecture. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network then predicts $P(y_i | x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces, phonemes, and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in the streaming fashion, the non-streaming fashion, or some combination thereof.

In some examples, the audio encoder 210 of the RNN-T model includes a plurality of multi-head (e.g., 8 heads) self-attention layers. For example, the plurality of multi-head self-attention layers may include Conformer layers (e.g., Conformer-encoder), transformer layers, performer layers, convolution layers (including lightweight convolution layers), or any other type of multi-head self-attention layers. The plurality of multi-head self-attention layers may include any number of layers, for instance 16 layers. Moreover, the audio encoder 210 may operate in the streaming fashion (e.g., the audio encoder 210 outputs initial higher-order feature representations as soon as they are generated), in the non-streaming fashion (e.g., the audio encoder 210 outputs subsequent higher-order feature representations by processing additional right-context to improve initial higher-order feature representations), or in a combination of both the streaming and non-streaming fashion.

Figure 3A:
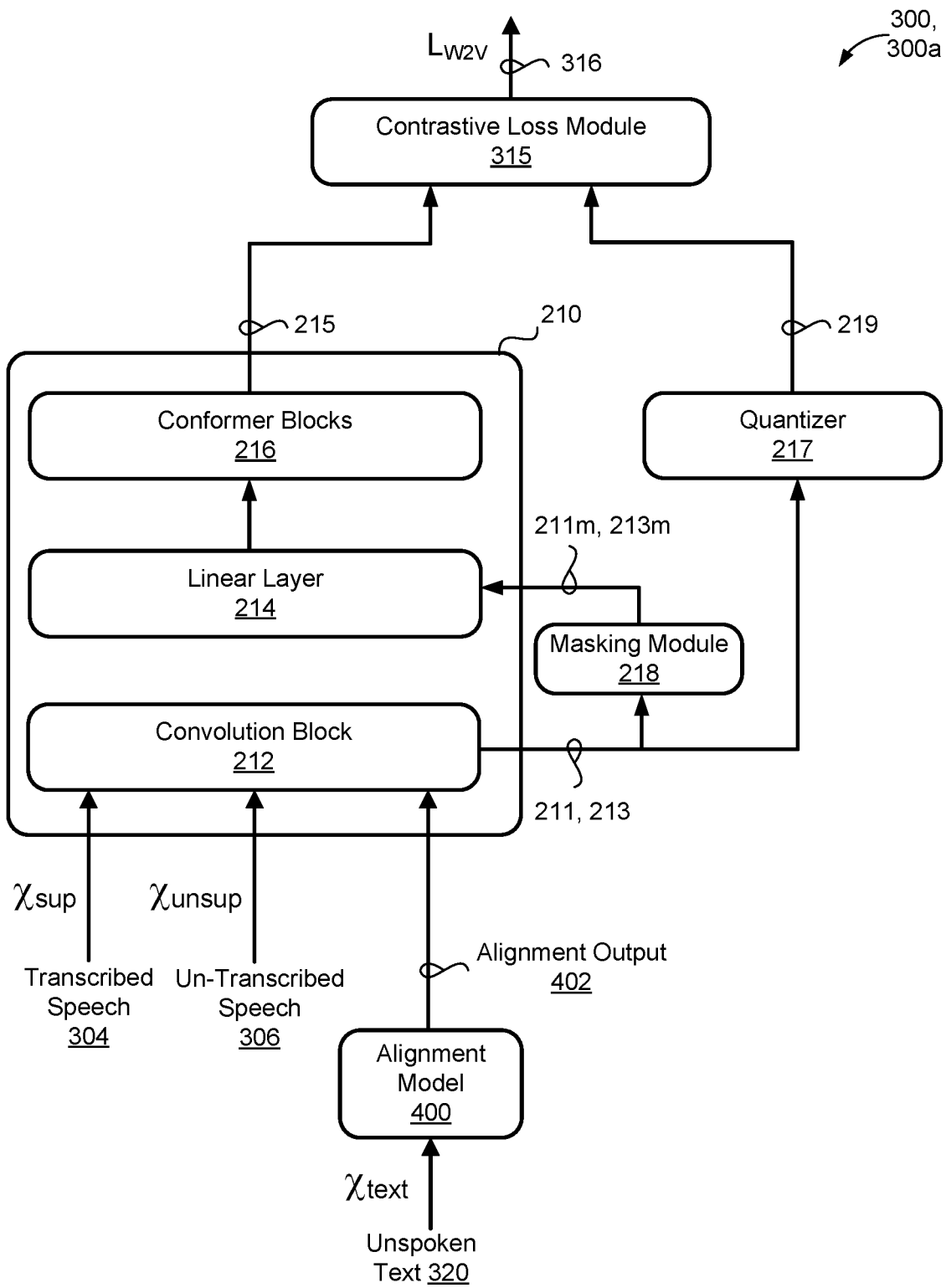
FIGS. 3A-3C are schematic views of an example training process for training an audio encoder of the speech recognition model of FIG. 2.
Figure 3B:
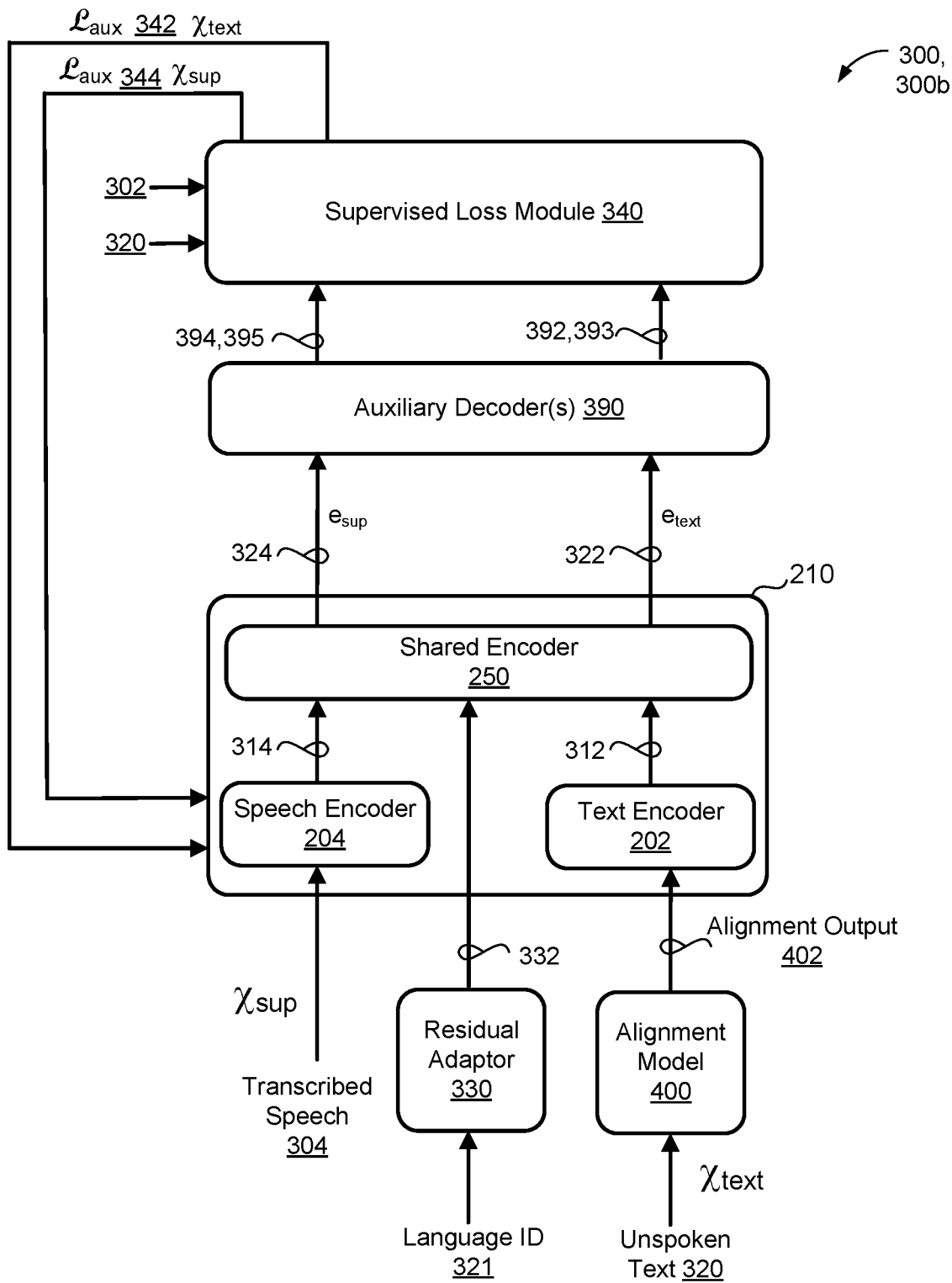
Figure 3C:
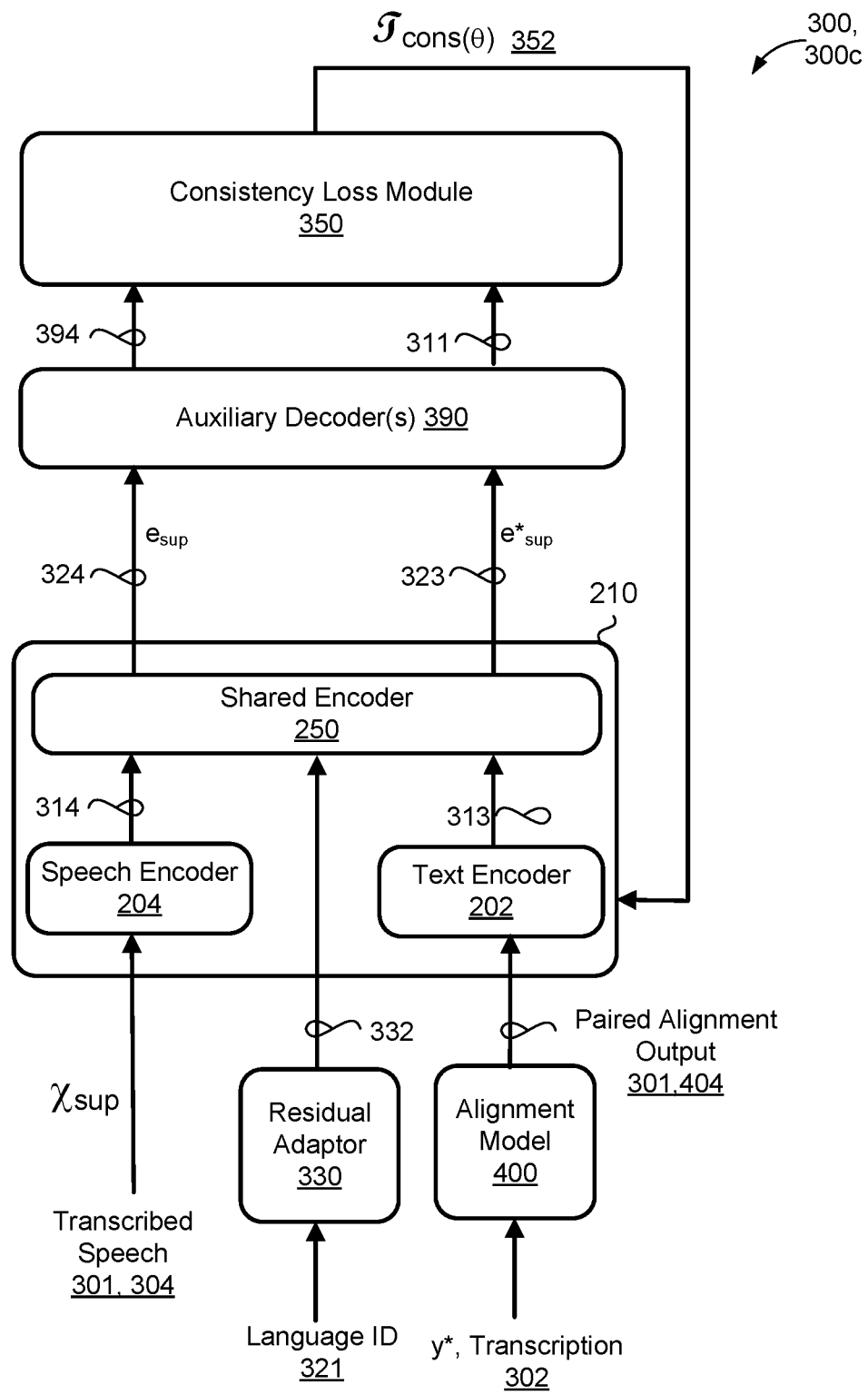

FIGS. 3A-3C illustrate an example training process 300 for training the ASR model 200 (FIG. 2). The training process 300 described herein describes training the audio encoder 210 of the ASR model 200, however, it is understood that the training process 300 may also include pre-training and/or fine-tune training of the audio encoder 210. Moreover, implementations described herein contemplate the training process 300 training the audio encoder 210 of the ASR model 200 without training the decoder (e.g., prediction network 220 and joint network 230) of the ASR model 200. Yet, it is understood that the training process 300 may additionally or alternatively train other components of the ASR model 200 (e.g., prediction network 220 and/or joint network 230) jointly with the audio encoder 210.

The training process 300 trains the audio encoder 210 using available training data that includes a set of unspoken textual utterances ($X_{text}$) 320, a set of transcribed non-synthetic speech utterances ($X_{sup}$) 304, and/or un-transcribed non-synthetic speech utterances ($X_{unsup}$) 306. Notably, each unspoken textual utterance 320 in the set of unspoken textual utterances 320 includes text-only data (i.e., unpaired data) in a target language such that each unspoken textual utterance 320 is not paired with any corresponding spoken audio representation (i.e., speech) of the utterance. Here, the target language is any language the training process 300 uses to train the audio encoder 210 to recognize where zero transcribed (i.e., labeled) training data is used during training. The unspoken textual utterance 320 may include any sequence text chunks including words, word-pieces, phonemes, and/or graphemes. Optionally, the available training data may also include the un-transcribed non-synthetic speech utterances 306 (also referred to as simply "un-transcribed speech utterance 306") each including audio-only data (i.e., unpaired data) in the target language such that the un-transcribed speech utterance 306 is not paired with any corresponding transcription. Notably, when the training data includes the un-transcribed speech utterances 306 in addition to the unspoken textual utterances 306, the un-transcribed speech utterances 306 represent different training utterances than the unspoken textual utterances 320 such that the training process 300 cannot simply pair the unspoken textual utterances 320 with the un-transcribed speech utterances 306 to generate labeled training data.

On the other hand, each transcribed non-synthetic speech utterance 304 (also referred to as simply "transcribed speech utterance 304") includes a corresponding transcription 302 paired with a corresponding non-synthetic speech representation of the corresponding transcribed speech utterance 304 in one or more training languages. Each of the one or more training languages is different from the target language. For example, the one or more training languages may include 52 languages with transcribed speech utterances and the target language may include another 50 languages (e.g., each different than the 52 training languages) with text-only training data. As will become apparent, the transcribed speech utterances 304 are used to train an alignment model 400 to generate alignment outputs 402 for the transcribed speech utterances 304 in the one or more training languages. Thereafter, the trained alignment model 400 is configured to receive, as input, the unspoken textual utterances 320 in the target language (e.g., different from each of the one or more training languages used to train the alignment model 400) and generate, as output, alignment outputs 402 in the target language used to train the audio encoder 210. Thus, training the alignment model 400 using the transcribed speech utterances 304 in the one or more training languages enables the alignment model 400 to generate alignment outputs 402 in the target language even though the alignment model 400 was never trained with any training data in the target language.

For simplicity, the training process 300 includes a contrastive self-supervised loss part 300a (FIG. 3A), a supervised loss part 300b (FIG. 3B), and a consistency regularization part 300c (FIG. 3C). The training process 300 trains the audio encoder 210 on a total loss ($L_{tts4pretrain2}$) based on: contrastive losses ($L_{w2v}$) 316 derived using the contrastive self-supervised loss part 300a from the unspoken training text utterances ($X_{text}$) 320 (e.g., in the target language), a corpus of transcribed non-synthetic speech utterances ($X_{sup}$) 304 (e.g., in the one or more training languages), and un-transcribed non-synthetic speech utterances ($X_{unsup}$) 306 (e.g., in the target language); supervised losses ($L_{aux}$) 342, 344 derived using the supervised loss part 300b from the unspoken training text utterances ($X_{text}$) 320 and the transcribed non-synthetic speech utterances ($X_{sup}$) 304; and consistency losses ($\mathcal{J}_{cons}(\theta)$) 352 derived using the consistency regularization part 300c.

Referring to FIG. 3A, the contrastive self-supervised loss part 300a of the training process 300 may employ an alignment model 400 that is configured to generate, at each of a plurality of output steps, alignment outputs (i.e., textual representations) 402 for each of a plurality of unspoken training text utterances 320. The unspoken textual utterances 320 includes unspoken text that is text-only data in the target language, i.e., unpaired data, such that each unspoken textual utterance ($X_{text}$) 320 is not paired with any synthesized or non-synthesized speech. Accordingly, the alignment model 400 generates a corresponding alignment output 402 for each of the unspoken textual utterances 320.

Figure 4:
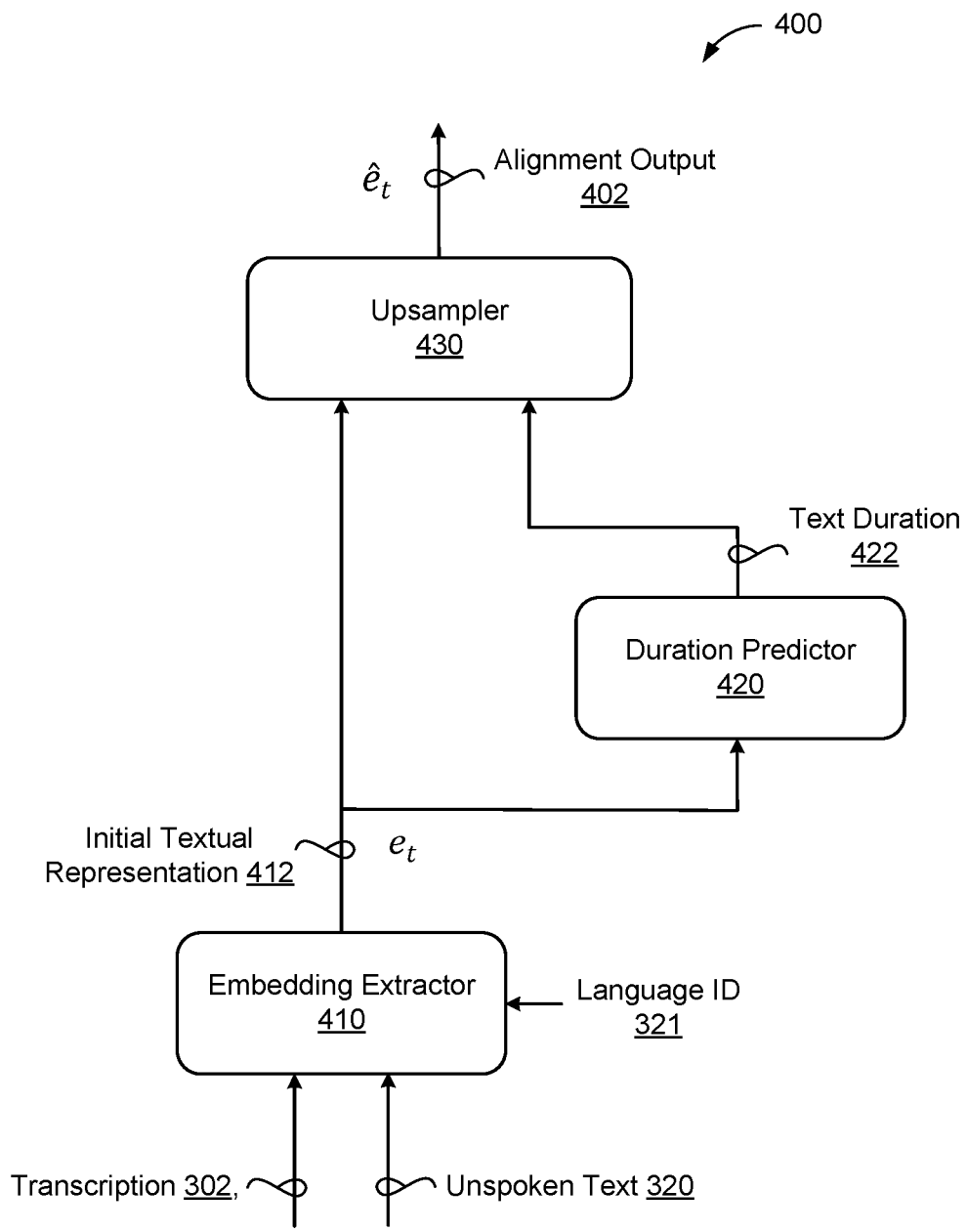
FIG. 4 is a schematic view of an alignment model used during the example training process for training the audio encoder of the speech recognition model in FIGS. 3A-3C.

Referring now to FIG. 4, in some examples, the alignment model 400 includes an embedding extractor 410, duration predictor 420, and an upsampler 430. The embedding extractor 410 receives the unspoken textual utterance 320 that includes a sequence of text chunks including words, word-pieces, phonemes, and/or graphemes and extracts a corresponding initial textual representation ($e_t$) 412. The initial textual representation 412 includes embedding lexical information from the unspoken textual utterance 320. Additionally or alternatively, the embedding extractor 410 may receive a transcription 302 corresponding to a transcribed non-synthetic speech utterance 304 (FIG. 3C). The duration predictor 420 receives the initial textual representation 412 from the embedding extractor 410 and predicts a corresponding text chunk duration (i.e., word, word-piece, phoneme, and/or grapheme duration) 422. The text chunk duration 422 indicates a duration the corresponding text chunk would be spoken if a human (or text-to-speech system) spoke the unspoken textual utterance 320. For example, the unspoken textual utterance 320 may include a sequence of phonemes and the duration predictor 420 predicts a phoneme duration 422 for each phoneme in the sequence of phonemes. In this example, the duration predictor 420 predicts the phoneme duration 422 by predicting a probability of non-zero duration for each phoneme and predicting a probability of continuous phoneme duration for each phoneme. As the sequence of phonemes includes regular phonemes, silences between word boundaries, and punctuation marks, only the regular phonemes are associated with non-zero duration while the silences and punctuation marks are generally associated with the continuous phoneme duration. Accordingly, the duration predictor 420 may use a sigmoid activation following a first one of two independent activations to predict the probability of non-zero duration and use a soft plus activation following a second one of the two independent projections to predict the continuous text chunk duration 422 for each text chunk. The duration predictor 420 determines, for each text chunk, whether the probability of non-zero duration is less than a threshold value, and when the probability of non-zero duration is less than the threshold value, a multiplier may zero-out the continuous text chunk duration 422 predicted by the softplus activation for the corresponding text chunk. Otherwise, when the probability of non-zero duration is not less than the threshold value, the predicted text chunk duration 422 may be set equal to the continuous phoneme duration predicted by the softplus activation.

The upsampler 430 receives, for each unspoken textual utterance 320, the corresponding initial textual representation 412 and the predicted text chunk duration 422, and generates an alignment output ($\hat{e}_t$) 402 having a number of frames by upsampling the initial textual representation 412 using the corresponding predicted text chunk duration 422. Here, the alignment output 402 represents an aligned speech-text representation. In some examples, the alignment model 400 sends the alignment output 402 to a text encoder 202 of the audio encoder 210 (FIGS. 3B and 3C). In other examples (not shown), the alignment model 400 sends the alignment output 402 to a shared encoder 250 (e.g., bypassing the text encoder 202) of the audio encoder 210 (FIGS. 3B and 3C). In these other examples, the alignment output 402 serves as the encoded textual representation 312 such that the shared encoder 250 may receive the alignment output 402 directly from the alignment model 400. In yet other examples, paired training data is available and the upsampler 430 generates the alignment output 402 as follows:

$$\hat{e}_t = \theta_{Refiner}(\text{Resample}(e_t, \text{Align}_{RNN-T}(e_s, t))) \quad (1)$$

Here, the upsampler 430 includes resampler and refiner layers that align the initial textual embedding 412 to align with a corresponding encoded audio representation 314 (FIGS. 3B and 3C) directly. However, when paired training data is not available, the upsampler 430 generates the alignment output 402 as follows:

$$\hat{e}_t = \theta_{Refiner}(\text{Resample}(e_t, \theta_{duration}(e_t))) \quad (2)$$

In particular, the number of frames of the alignment output 402 indicates a predicted speech duration of the unspoken textual utterance 320. Stated differently, the number of frames of the alignment output 402 maps (i.e., aligns) the sequence of text chunks of the unspoken textual utterance 320 to speech frames. Here, the upsampler 430 includes resampler and refiner layers that replicate the initial textual embedding 412 to match the predicted text chunk duration 422 (i.e., speech duration). As such, the alignment output 402 includes a textual representation of the unspoken textual utterance 320 having a timing component that aligns with how a human would speak the unspoken textual utterance 320. In some examples, the embedding extractor 410 receives the language identifier 321 that uniquely identifies the language of the one or more training languages and/or the target language to condition the alignment model 400.

In some implementations, training the alignment model 400 using training data in the one or more training languages, and then, generating alignment outputs 402 in the target language (e.g., different than each of the training languages) leads to low quality alignment outputs 402 because a script (e.g., Brahimic) of the target language has no overlap with scripts of the one or more training languages. To that end, in some examples, the alignments model 400 includes a pronunciation model that converts a script of the unspoken textual utterances 320 in the target language into a representation (e.g., phonetic representation) shared across multiple languages. In other examples, the alignment model 400 may transliterate the script of the unspoken textual utterances 320 into a different script. That is, the different script may align with the scripts of the transcribed speech utterances 304.

Notably, in most instances, a text-to-speech (TTS) system generates an audible output to give the unspoken textual utterance 320 the timing component of human speech such that a training process may use the audible output from the TTS system (i.e., synthetic speech) to train the audio encoder 210. However, the alignment model 400 advantageously generates the alignment output 402 thereby mapping the sequence of text chunks to speech frames directly. As such, the training process 300 does not require any TTS system to generate synthetic speech from the unspoken textual utterances 320 to train the audio encoder 210. That is, neither the training process 300 nor the alignment model 400 converts the unspoken textual utterance 320 into synthetic speech, but rather generates alignment outputs 402 (i.e., text alignments).

Figure 5:
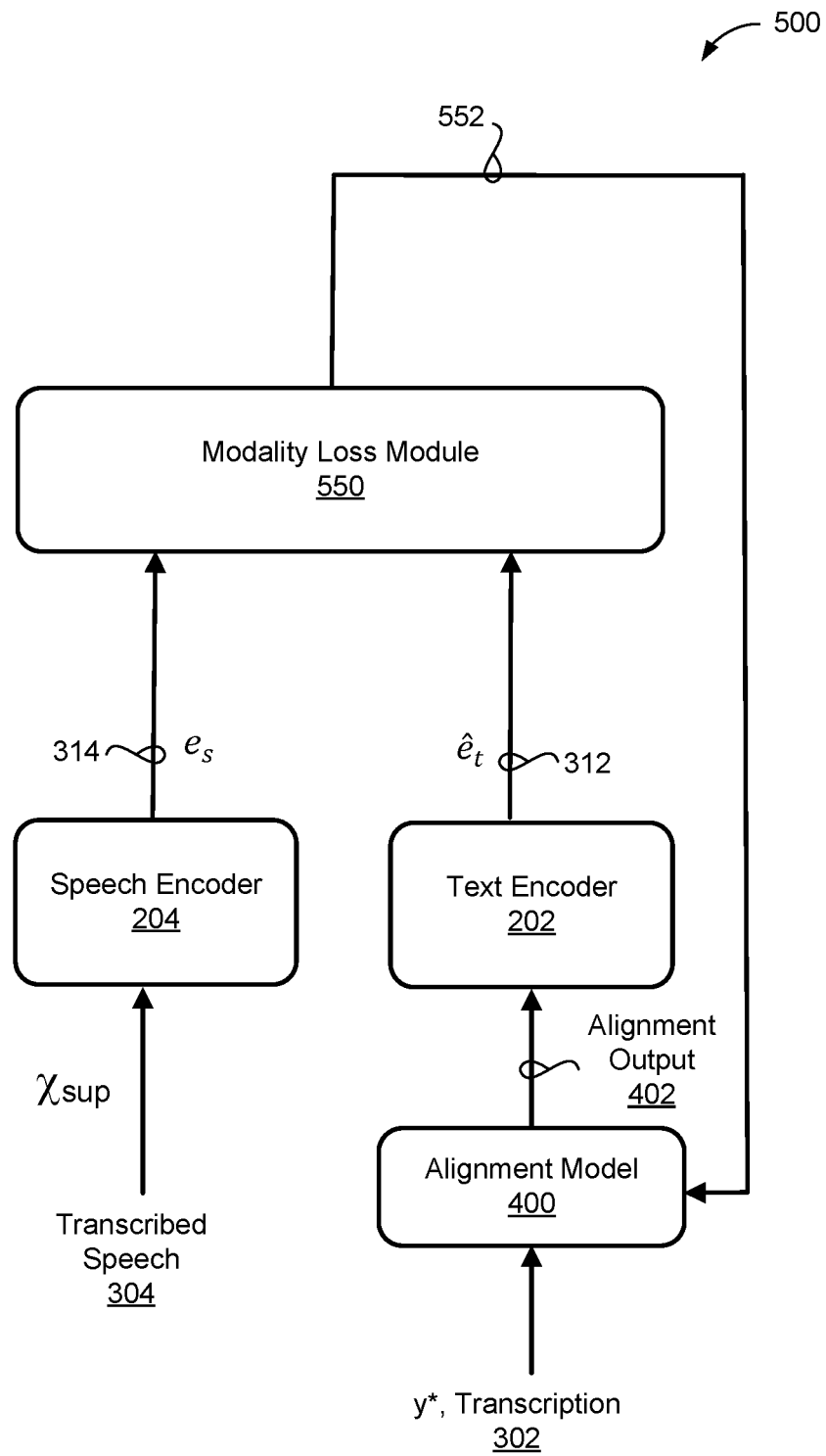
FIG. 5 is a schematic view of an example training process for training a duration predictor of the alignment model.

FIG. 5 illustrates an example training process 500 for training the alignment model 400 using transcribed non-synthetic speech utterances 304 in the one or more training languages. That is, each of the one or more training languages is a different language than the target language audio encoder 210 (FIG. 3) is trained to recognize. Moreover, each transcribed non-synthetic speech utterance 304 has a corresponding transcription 302. In the example shown, the speech encoder 204 receives, as input, each transcribed non-synthetic speech utterance 304 as a sequence of features/vectors (e.g., mel-frequency spectrograms such as the acoustic frames 110 of FIG. 1) and generates, as output, for each of a plurality of output steps, an encoded audio representation ($e_s$) 314 that corresponds to the transcribed non-synthetic speech utterance 304 at the corresponding output step. In parallel, the alignment model 400 receives the transcription 302 corresponding to the same non-synthetic speech utterance 304 and generates an alignment output 402 according to Equation 1. The text encoder 202 receives, as input, the alignment output 402 and generates, as output, for each of the plurality of output steps, an encoded textual representation ($\hat{e}_t$) 312 that corresponds to the transcription 302 at the corresponding output step.

A modality loss module 550 receives the encoded textual representation 312 and the encoded audio representation 314 and generates a modality loss 552 based on comparing the encoded textual representation 3412 and the encoded audio representation as follows:

$$\mathcal{L}_{MM} = MSE(e_s, \hat{e}_t) + \mathcal{L}_{RNNT}(t|e_s) \quad (3)$$

Equation 3 adds the mean squared error (MSE) of the encoded textual representation ($\hat{e}_t$) 312 and the encoded audio representation ($e_s$) 314 to RNN-T model alignments between predicted text targets and the encoded audio representations ($e_s$) 314 to determine the modality loss ($\mathcal{L}_{MM}$) 552. Here, the encoded audio representations 314 serve as a ground-truth label to train the alignment model 400 to generate alignment outputs 402 that align to the corresponding non-synthetic speech utterances 304. The training process 700 may use the modality loss 552 to update parameters of the alignment model 400. For example, the training process 700 may update parameters of the duration predictor 420 and/or the upsampler 430 (FIG. 4).

Figure 6:
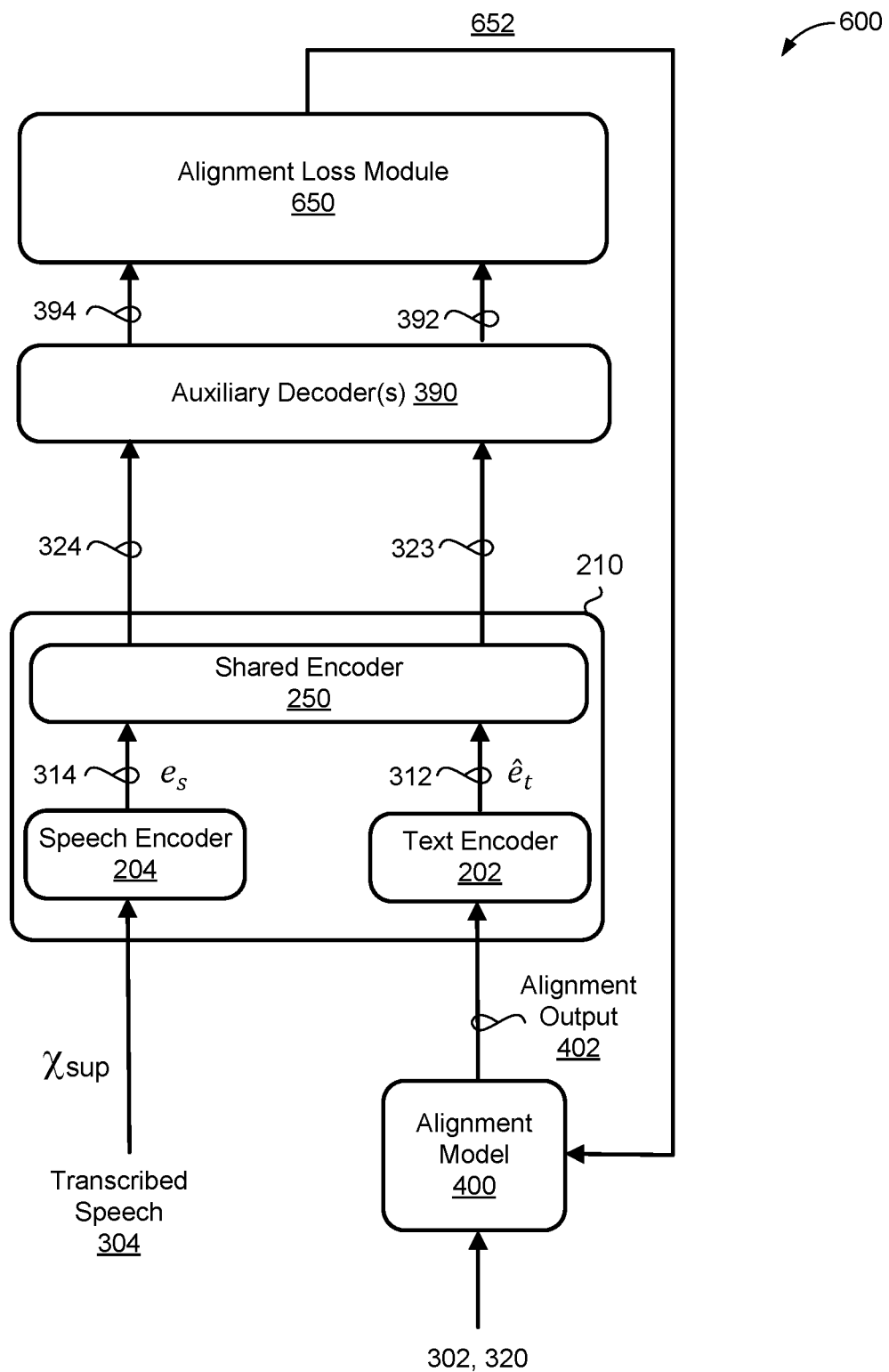
FIG. 6 is a schematic view of an example training process for training an upsampler of the alignment model.

FIG. 6 illustrates an example training process 600 for training the alignment model 400 using paired training data (i.e., transcribed speech utterances 304 in the one or more training languages) and unpaired training data (i.e., unspoken textual utterances 320 in the target language). That is, the training process 600 uses transcribed non-synthetic speech utterances 304 that have corresponding transcriptions 302 (i.e., paired training data) and unspoken textual utterances 320 (i.e., unpaired training data) to learn speech-aligned alignment outputs 402. In the example shown, the speech encoder 204 receives, as input, each transcribed non-synthetic speech utterance 304 as a sequence of features/vectors (e.g., mel-frequency spectrograms such as the acoustic frames 110 of FIG. 1) and generates, as output, for each of the plurality of output steps, an encoded audio representation ($e_s$) 314 that corresponds to the transcribed non-synthetic speech utterance 304 at the corresponding output step. In parallel, the alignment model 400 receives the transcription 302 corresponding to the same non-synthetic speech utterance 304 and generates an alignment output according to Equation 1. Additionally or alternatively, the alignment model 400 may receive the unspoken textual utterance 320 and generate an alignment output 402 according to Equation 2. The text encoder 202 receives, as input, the alignment output 402 and generates, as output, for each of the plurality of output steps, an encoded textual representation ($e_t$) 314.

The audio encoder 210 may include a shared encoder 250 that receives, as input, the encoded textual representations 312, and generates, as output, a first encoded shared representation 322. The shared encoder 250 may also receive, as input, the encoded audio representations 314 and generate, as output, a second encoded shared representation 324. An auxiliary decoder 390 receives, as input, the first and second encoded shared representations 322, 324 and generates, as output, corresponding first and second probability distributions 392, 294 over possible speech recognition hypotheses.

An alignment masked loss module 650 receives the first probability distribution 392 corresponding to the encoded textual representation 312 and the second probability distribution 394 corresponding to the encoded audio representation 314 and generates an alignment loss 652 as follows:

$$\mathcal{L}_{A\text{-}MLM} = \mathcal{L}_{RNNT}(t|\text{Mask}(\hat{e}_t)) \quad (4)$$

The alignment loss 652 from Equation 4 may be applied over the masked, sampled encoded textual representations 312 in a frequency and time domain. Notably, the alignment loss 652 may be used as a training objective for both paired training data and unpaired training data. The training process 600 may use the alignment loss 652 to update parameters of the alignment model 400. For example, the training process 800 may update parameters of the duration predictor 420 and/or the upsampler 430 (FIG. 4).

Referring back to FIG. 3A, in some implementations, the audio encoder 210 includes a speech encoder 204 and a text encoder 202, described in more detail with reference to FIGS. 3B and 3C. In the example shown, the audio encoder 210 (alternatively the speech encoder 204 or the text encoder 202 (FIGS. 3B and 3C)) includes a Conformer encoder including a stack of Conformer blocks each of which includes a stack of multi-headed self-attention, depth wise convolution, and feed-forward layers. Alternatively, the audio encoder 210 may include another type of encoder having a stack of multi-head self-attention layers/blocks, such as a transformer or performer encoder. The Conformer encoder 210 can naturally be split into a feature encoder, including a convolution subsampling block 212, and a context network, including a linear layer 214 and a stack of Conformer blocks 216. In some implementations, the convolution subsampling block 212 has two two-dimensional-convolution layers, both with strides (2, 2), resulting in a 4× reduction in the feature sequence length. The convolution subsampling block 212 receives, as input, a sequence of input features/vectors (e.g., mel-frequency spectrograms such as the acoustic frames 110 of FIG. 1) associated with each transcribed non-synthetic speech utterance 304 and each un-transcribed non-synthetic speech utterance 306, and generates, as output, for each of a plurality of output steps, an encoded audio feature 211 that corresponds to a respective one of the transcribed non-synthetic speech utterances 304 or a respective one of the un-transcribed non-synthetic speech utterances 306. The convolution subsampling block 212 may receive, as input, each alignment output 402 generated by the alignment model 400 from the unspoken textual utterances 320 and generate, as output, for each of the plurality of output steps, an encoded textual feature 213 that corresponds to a respective one of the alignment outputs 402.

The encoded audio and textual features 211, 213 (i.e., interchangeably referred to as "encoded features 211, 213") output from the convolution subsampling block 212 may be fed to a masking module 218 where some of the encoded features 211, 213 are randomly chosen and replaced with a trained feature vector shared between all masked time steps to provide corresponding masked encoded audio features 211, 211m and masked encoded textual features 213, 213m. In some examples, the masking module 218 masks the randomly chosen encoded features 211, 213 for masking by randomly sampling without replacement a certain proportion p of all time steps to be start indices and then masks the subsequent M consecutive time steps from every sample index, whereby some spans may overlap. After masking is applied, the linear layer 214 and the Conformer blocks 216 of the context network receive the masked encoded features 211m, 213m (or encoded features 211, 213 not chosen by the masking module 218) and outputs corresponding contrastive context vectors (i.e., encoded representation) 215 from masked encoded features 211m, 213m. Moreover, a quantizer 217 receives the encoded features 211, 213 as input, and generates quantized vectors (i.e., target context vectors) 219 as output. Thereafter, a contrastive loss module 315 derives a contrastive loss ($L_{w2v}$) 316 between the contrastive context vectors 215 at the masked positions and the target context vectors 219 as follows.

$$\mathcal{L}_{w2v} = -\log \frac{\exp(sim(c_t, q_t)/k)}{\Sigma_{\tilde{q} \sim Q_t} \exp(sim(c_t, \tilde{q})/k)} \qquad (5)$$

where $c_t$ is contrastive context vector 215 centered over a masked output step (i.e., time step) t and $q_t$ represents a target context vector 219 at the output step tin a set of K+1 candidate target context vectors 219 which includes $q_t$ and K distractors. Distractors may be uniformly sampled from other masked output steps of the same utterance.

The contrastive loss 316 is optimized between the contrastive context vectors 215 at the masked positions and the target context vectors 219. After the audio encoder 210 converges on the un-transcribed non-synthetic speech utterances 306, the training procedure is repeated on both the alignment outputs 402 corresponding to the unspoken textual utterance 320 and the transcribed non-synthetic speech utterances 304. Thus, the contrastive loss 316 ($L_{w2v}$) is optimized for both real/human (non-synthetic) and unspoken textual utterances 320 represented by alignment outputs 402, with additional auxiliary losses derived from the transcribed non-synthetic speech utterances 304 and the alignment outputs 402 as described in greater detail below with reference to FIG. 3B. Accordingly, the contrastive self-supervised loss part 300a of the training process 300 trains the audio encoder 210 using the contrastive loss 316 derived from the corresponding encoded features 211, 213 associated with each alignment output 402, each transcribed non-synthetic speech utterance 304, and each un-transcribed non-synthetic speech utterance 306 provided as input to the audio encoder 210. Training the audio encoder 210 may include updating parameters of the audio encoder 210 based on the contrastive losses 316.

Referring to FIG. 3B, the supervised loss part 300b of the training process 300 is configured to inject lexical information into the audio encoder 210 during training based on supervised loss terms 342, 344 derived from the transcribed non-synthetic speech utterances and the alignment outputs 402 corresponding to unspoken textual utterances 320 output by the alignment model 400. Notably, the supervised loss part 300b leverages one or more auxiliary decoders 390 for generating the supervised loss terms 342, 344. The auxiliary decoders 390 may include Connectionist Temporal Classification (CTC) decoders, Listen Attend Spell (LAS) decoders, or RNN-T decoders. These auxiliary decoders 390 may include at least one of a phoneme decoder configured to decode a sequence of phonemes or a wordpiece decoder configured to decode a sequence of word pieces. The auxiliary decoders 390 could also include a grapheme decoder configured to decode a sequence of graphemes.

During the supervised loss part 300b, the text encoder 202 of the audio encoder is configured to receive alignment outputs 402 (i.e., text embeddings) from the alignment model and the speech encoder is configured to receive transcribed non-synthetic speech utterances 304. That is, the text encoder 202 of the audio encoder generates encoded textual representations 3123 for alignment outputs 402 (e.g., corresponding to an unspoken textual utterance 320) and the speech encoder 204 of the audio encoder 210 generates encoded audio representations 314 for speech inputs (i.e., transcribed non-synthetic speech utterances 304). Here, the encoded textual representations 312 and the encoded audio representations 314 may not both be compatible with the auxiliary decoders 390. Thus, the audio encoder 210 may also include a shared encoder 250 that receives the encoded textual representations 312 as input, and generates a first encoded shared representation 322 ($e_{text}$) as output. Moreover, the shared encoder 250 receives the encoded audio representations 314 as input, and generates a second encoded shared representation ($e_{sup}$) 324 as output. Accordingly, the shared encoder 250 generates the first and second encoded shared representations 322, 324 into a shared latent representation space compatible with the auxiliary decoder 390.

In particular, the shared encoder 250 receives, as input, each encoded textual representation 312 that corresponds to the alignment output 402 generated from the unspoken textual utterance 320 and generates, as output, for each of the plurality of output steps, the first encoded shared representation ($e_{text}$) 322 that corresponds to the alignment output 402 at the corresponding output step. The auxiliary decoder 390 including the phoneme decoder, wordpiece decoder, or the byte decoder receives, as input, each first encoded shared representation 322 output from the shared encoder 250 and generates, as output, a first probability distribution 392 over possible speech recognition hypotheses for the corresponding alignment output 402 at the corresponding time step. In some examples, the first probability distribution 392 over possible speech recognition hypotheses includes one of possible phoneme labels, possible word piece labels, or possible grapheme labels. Thereafter, a supervised loss module 340 may determine an alignment output loss term 342 based on the first probability distribution 392 over possible speech recognition hypotheses for the alignment output 402 corresponding to the unspoken textual utterance 320. Here, the corresponding unspoken textual utterance 320 in which the alignment output 402 is generated from, also serves as a ground-truth transcription. The supervised loss part 300b may train the audio encoder 210 on the alignment output loss term 342 by updating parameters of the audio encoder 210 based on the alignment output loss term 342.

Similarly, during the supervised loss part 300b, the shared encoder 250 receives, as input, each transcribed encoded audio representation 314 that corresponds to the non-synthetic speech utterance 304 and generates, as output, for each of the plurality of output steps, a second encoded shared representation ($e_{sup}$) 324 that corresponds to the transcribed non-synthetic speech utterance 304 at the corresponding output step. The auxiliary decoder 390 including the phoneme decoder, the wordpiece decoder, or the byte decoder receives, as input, each second encoded shared representation 324 output from the shared encoder 250 and generates, as output, a second probability distribution 394 over possible non-synthetic speech recognition hypotheses for the corresponding transcribed non-synthetic speech utterance 304 at the corresponding output step. In some examples, the second probability distribution 394 over possible non-synthetic speech recognition hypotheses includes the one of possible phoneme labels, the possible word piece labels, or the possible grapheme labels. Thereafter, the supervised loss module 340 may determine a non-synthetic speech loss term 344 based on the second probability distribution 394 over possible non-synthetic speech recognition hypotheses and the corresponding transcription 302 paired with the transcribed non-synthetic speech utterance 304. Here, the corresponding transcription 302 serves as a ground-truth transcription and may include a sequence of target phonemes, target word pieces, and/or target graphemes. The supervised loss part 300b may train the audio encoder 210 on the non-synthetic speech loss term 344 by updating parameters of the audio encoder 210 based on the non-synthetic speech loss term 344.

In some implementations, the supervised loss part 300b of the training process 300 uses another auxiliary decoder 390 to generate a third probability distribution 393 over possible speech recognition hypotheses based on the first encoded shared representation (e_text) 322 for the alignment output 402 at the corresponding output step, whereby the supervised loss module 340 may determine another alignment output loss term 342 based on the third probability distribution 393 and the unspoken textual utterance 320 corresponding to the alignment output 402. Here, the other auxiliary decoder 390 includes the other one of the phoneme decoder, word piece decoder, or the grapheme decoder and the third probability distribution 393 over possible speech recognition hypotheses includes the other one of the possible phoneme labels, the possible word piece labels, or the possible grapheme labels. In these implementations, the other auxiliary decoder 390 also generates a fourth probability distribution 395 over possible non-synthetic speech recognition hypotheses for the corresponding second encoded shared representation 324 at the corresponding output step, whereby the supervised loss module 340 may determine another non-synthetic speech loss term 344 based on the fourth probability distribution 395 and the corresponding transcription 302 that is paired with the transcribed non-synthetic speech representation 304. Here, the fourth probability distribution 395 over possible non-synthetic speech recognition hypotheses includes the other one of the possible phoneme labels, the possible word piece labels, or the possible grapheme labels. The supervised loss part 300b of the training process 300 may similarly the audio encoder 210 on the other alignment output loss term 342 and the other non-synthetic speech loss term 344.

The un-transcribed non-synthetic speech utterances 306 and the unspoken textual utterances 320 each correspond to "unpaired" training data whereby the contrastive loss ($L_{w2v}$) 316 derived from the unspoken textual utterances ($X_{text}$) 320 may be combined with the supervised loss $\mathcal{J}_{aux}$ associated with the alignment output loss term 342 to obtain an unspoken textual loss function, $\mathcal{J}_{text}$, as follows.

$$\mathcal{J}_{text} = \mathcal{L}_{w2v}(x|\theta_e) + \mathcal{L}_{aux}(y|x,\theta_e,\theta_d) \quad (6)$$

Likewise, the contrastive loss ($L_{w2v}$) 316 derived from the un-transcribed non-synthetic speech utterances ($X_{unsup}$) 306 may be used to express an unsupervised speech loss function, $\mathcal{J}_{unsup\_speech}$, as follows.

$$\mathcal{J}_{unsup\_speech} = \mathcal{J}_{w2v}(x^*|\theta_e) \quad (7)$$

During training of the audio encoder 210, the alignment outputs 402 and the un-transcribed non-synthetic utterances 306 may be separated or mixed within each batch. In order to force the audio encoder 210 to learn representations that are effective for both alignment outputs 402 corresponding to unspoken textual utterances 320 and non-synthetic (human/real) speech, the loss mask σ is applied when combining the loss functions $\mathcal{J}_{text}$ and of Equations 5 and 6 to obtain an unpaired data loss function, $\mathcal{J}_{unpaired}$, as follows:

$$\mathcal{J}_{unpaired} = \sigma \mathcal{J}_{text} + (1-\sigma) \mathcal{J}_{speech} \quad (8)$$

The transcribed non-synthetic speech utterances 304 corresponds to "paired" and "supervised" training data whereby the derived contrastive loss $L_{w2v}$ and the derived supervised loss $\mathcal{J}_{aux}$ associated with the non-synthetic speech loss term 344 may be combined to obtain a paired data loss function, $\mathcal{J}_{paired}$, as follows:

$$\mathcal{J}_{paired} = \mathcal{L}_{w2v}(x|\theta_e) + \mathcal{L}_{aux}(y|x,\theta_e,\theta_d) \quad (9)$$

In some scenarios, after training the audio encoder 210, the ASR model recognizes audio from the target language during inference with graphemes from the training languages. As such, in some implementations, the supervised part 300b of the training process 300 employs residual adaptor layers 330 that condition at least one of the audio encoder 210 or the decoder (e.g., prediction network 220 and joint network 230 (FIG. 2)) on a language identifier 321 that uniquely identifies the target language. Each residual adaptor layer 330 includes a small feed forward network including self-attention layers (e.g., 2 self-attention layers) with a bottleneck dimension. Thus, the residual identifier output 332 is fed to the shared encoder 250 such that the audio encoder 210 is conditioned on the language identifier 321 and does not recognize audio from the target language during inference with graphemes from the training languages.

Referring to FIG. 3C, the consistency regularization part (i.e., modality matching part) 300c of the training process 300 is configured to promote the audio encoder 210 to learn consistent predictions between non-synthetic speech (e.g., real/human speech) and alignment outputs 402 corresponding to unspoken textual utterances 320 by generating a consistent loss term ($\mathcal{J}_{cons}(\theta)$) 352 between training utterance pairs 301 that each include a corresponding one of the transcribed non-synthetic speech utterances ($X_{sup}$) 304 and a paired alignment output 404 of the same utterance as the corresponding transcribed non-synthetic speech utterance 304. As such, the non-synthetic speech utterance 304 and the paired alignment output 404 of each training utterance pair 301 is associated with a same ground-truth transcription. In short, the consistent loss term 352 between the transcribed non-synthetic speech utterance 304 and paired alignment output 404 of the same training utterance provides an unsupervised training aspect by encouraging the audio encoder 210 to behave consistently regardless of whether the training utterance belongs to non-synthetic speech (i.e., speech training data) or the alignment output (i.e., text training data) and independent of supervised loss terms between the ground-truth transcription 302 and each of: non-synthetic speech recognition hypotheses output by the auxiliary decoder 390; and speech recognition hypotheses output by the auxiliary decoder 390.

Similar to the alignment outputs 402 generated from the unspoken textual utterances 320 in FIG. 3B, the alignment model 400 may generate each paired alignment output 404 using the corresponding transcription 302 that is paired with transcribed non-synthetic speech utterance 304. Here, the non-synthetic speech representation 304 is associated with paired alignment output 404 generated by the alignment model 400 mapping the unspoken textual utterance 320 into speech frames.

During the consistency regularization part 300c, the text encoder 202 receives, as input, each paired alignment output 404 and generates, as output, for each of the plurality of output steps, an encoded textual representation 313 that corresponds to the paired alignment output 404 at the corresponding output step. The shared encoder 250 receives, as input, the encoded textual representation 313 and generates, as output, a first encoded shared representation ($e^*_{sup}$) 323. The auxiliary decoder 390 including the phoneme decoder or the wordpiece decoder receives, as input, each first encoded shared representation 323 output from the shared encoder 250 and generates, as output, a first probability distribution 311 over possible speech recognition hypotheses for the corresponding paired alignment output 404 at the corresponding output step. In some examples, the first probability distribution 311 over possible speech recognition hypotheses includes one of possible phoneme labels or possible word piece labels.

Similarly, the speech encoder 204 receives, as input, each transcribed non-synthetic speech utterance 304 as a sequence of features/vectors (e.g., mel-frequency spectrograms such as the acoustic frames 110 of FIG. 1) and generates, as output, for each of a plurality of output steps, a encoded audio representation 314 that corresponds to the transcribed non-synthetic speech utterance 304 at the corresponding output step. The shared encoder 250 receives, as input, the encoded audio representation 314 and generates, as output, a second encoded shared representation ($e_{sup}$) 324. The auxiliary decoder 390 including the phoneme decoder or the wordpiece decoder receives, as input, each second encoded shared representation 324 output from the shared encoder 250 and generates, as output, a second probability distribution 394 over possible non-synthetic speech recognition hypotheses for the corresponding transcribed non-synthetic speech utterance 304 at the corresponding time step. In some examples, the second probability distribution 394 over possible non-synthetic speech recognition hypotheses includes the one of the possible phoneme labels or the possible word piece labels.

With continued reference to FIG. 3C, the consistency regularization part 300c of the training process 300 further determines, at each of the plurality of time steps for each training utterance pair 301, the consistent loss term ($\mathcal{J}_{cons}(\theta)$) 352 for the corresponding training utterance pair 301 based on the first probability distribution 311 over possible speech recognition hypotheses and the second probability distribution 394 over possible non-synthetic speech recognition hypotheses. For instance, the training process 300 may employ a consistency loss term module 350 configured to receive, at each time step, the corresponding non-synthetic speech and speech recognition results 311, 394 output by the auxiliary decoder 390, and determine the consistency loss term 352 for the corresponding training utterance pair 301 at the time step.

In some examples, the consistency regularization part 300c of the training process 300 determines the consistent loss term 352 based on a Kullback-Leibler divergence ($D_{KL}$) between the first probability distribution 311 over possible speech recognition hypotheses and the second probability distribution 394 over possible non-synthetic speech recognition hypotheses. The consistent loss term 352 based on $D_{KL}$ may be expressed by the following equation:

$$\mathcal{J}_{cons}(\theta) = \mathcal{D}_{KL}(p_\theta(y|x) \| p_\theta(y|\hat{x})) \quad (10)$$

Here, the consistent loss term 352 determined for the training utterance pair 301 at each time step provides an "unsupervised" loss term that is independent of the accuracy of the auxiliary decoder 390 (e.g., independent of the supervised loss terms 342, 344 of FIG. 3B), and thus, may be employed to update parameters of the audio encoder 210 for promoting consistency between non-synthetic speech representations and alignment outputs of the same utterances. In batch training, the consistent loss term 352 may correspond to an average loss term obtained for the batch. In other words, the consistent loss term 352 permits the audio encoder 210 to learn to behave the same, e.g., make consistent encoded representation predictions on both non-synthetic speech (e.g., real/human speech) and alignment outputs of a same training utterance, regardless of whether the training utterance belongs to non-synthetic speech or alignment outputs.

Lastly, the training process 300 may combine the unpaired data loss function ($\mathcal{J}_{unpaired}$), the paired data loss function ($\mathcal{J}_{paired}$), and the consistent loss term ($\mathcal{J}_{cons}$) to obtain an overall loss term, $\mathcal{J}_{tts4pretrain2}$, that may be expressed as follows.

$$\mathcal{J}_{tts4pretrain2} = \mathcal{J}_{unpaired} + \lambda_1 \mathcal{J}_{paired} + \lambda_2 \mathcal{J}_{cons} \quad (11)$$

where $\lambda_1$ may be equal to 1.0 and $\lambda_2$ is equal to 0.1. The training process 300 may pre-train the audio encoder 210 using the overall loss term, $\mathcal{J}_{tts4pretrain2}$, by updating parameters of the audio encoder 210 to effectively teach the audio encoder 210 to learn shared representations between speech and text in the target language even though no labeled training data in the target language is available. After training the audio encoder 210, the training process 300 may fine-tune the pre-trained audio encoder on transcribed speech utterances that may include supervised training samples of both alignment outputs corresponding to unspoken textual utterance 320 and non-synthetic (e.g., human speech).

In some implementations, the training process 300 for training the audio encoder 210 applies encoder consistency regularization. Unlike decoder consistency regularization applied to auxiliary decoder(s) during the consistency regularization part 300c that requires hypothesized labels (e.g., transcripts 302 and unspoken textual utterances 320), encoder consistency regularization does not require hypothesized labels and therefore has the advantage being allowed to be applied to all the training data 304, 306, 320. Encoder consistency regularization may be applied via Hierarchical Contrastive consistency Regularization (HCCR) techniques where encoder activations e, e* from original/non-augmented and augmented speech are projected through an auxiliary network to generate z and z*. Thereafter, positive and negative pairs are constructive and a contrastive loss $l_{t,z,z*}$ is calculated as follows:

$$l_{t,z,z^*} = -\log \frac{\exp(sim(z_t^*, z_t)/\tau)}{\sum_{k=1}^{T} \exp(sim(z_t^*, z_k)/\tau)} \quad (12)$$

Specific to HCCR, a Convolutional Neural Network (CNN) projection network may calculate projections over increasing length segments of encoder activations e (30, 50, 120 ms) to yield 3 views (V) and draw negative examples from the same utterance for short segments, and from other utterances in the batches with 120 ms segments. Accordingly, an HCCR loss may be calculated over the transcribed non-synthetic speech utterances 304 (paired speech), the un-transcribed non-synthetic speech utterances 306 (unpaired speech), and the alignment outputs 402 generated from the unspoken textual utterances 320 as follows:

$$\mathcal{L}_{enc\_cons} = \sum_{v=1}^{V} \sum_{t=1}^{T^{(v)}} l_{t, z^{*(v)}, z^{(v)}} \quad (13)$$

The HCCR loss calculated by Equation 13 may be added to Equation 11 with a coefficient of 1 e−3 as part of the overall loss term, $\mathcal{J}_{tts4pretrain2}$, for use in pre-training the audio encoder 210.

Implementations described above describe the training process 300 training the training the audio encoder 210 for a target language, however, it is understood that the training process 300 may also be employed to train the audio encoder for multiple target languages each different from the one or more training languages. As such, the audio encoder 210 for a multilingual ASR model 200. In some instances, the training process 300 may be employed to train end-to-end ASR models with decoder structures (i.e., non-pre-training) or fine-tune an ASR model to perform downstream tasks such as speech translation or natural language understanding. Moreover, implementations described above describe the training process using each part 300*a-c* of the training process 300. Yet, it is understood any combination of the training parts 300*a-c* may be used to train the audio encoder 210 using any combination of unspoken textual utterances 320, transcribed non-synthetic speech utterances 304, and/or untranscribed non-synthetic speech utterances 306 independently.

For instance, the transcribed non-synthetic speech utterances 304 in the one or more training languages may initially be used to train the alignment model 400 (FIGS. 5 and 6). Thereafter, using the alignment model 400 trained using labeled training data in the one or more training languages, the training process 300 may train the audio encoder using the alignment output loss term 342 derived from the unspoken textual utterances 320 in the target language(s) during the supervised loss part 300*b*. Advantageously, the training process 300 may leverage high-resource languages (e.g., where an abundance of labeled training data already exists) to initially train the alignment model 400 and use the trained alignment model 400 to train the audio encoder 210 on a low-resource (e.g., little or zero labeled training data exists) target language. Simply put, by training the alignment model using the large amount of labeled training data with one or more high-resource languages the alignment model 400 learns to generate alignment outputs in target languages even though the alignment model 400 was never trained on any data (or zero labeled training data) in the target language.

In some scenarios, after training the audio encoder 210, the ASR model recognizes audio from the target language during inference with graphemes from the training languages. As such, in some implementations, the consistency regularization part 300*c* of the training process 300 employs the residual adaptor layers 330 that condition at least one of the audio encoder 210 or the decoder (e.g., prediction network 220 and joint network 230 (FIG. 2)) on the language identifier 321 that uniquely identifies the target language. Each residual adaptor layer 330 includes a small feed forward network including self-attention layers (e.g., 2 self-attention layers) with a bottleneck dimension. Thus, the residual identifier output 332 is fed to the shared encoder 250 such that the audio encoder 210 is conditioned on the language identifier 321 and does not recognize audio from the target language during inference with graphemes from the training languages.

Figure 7:
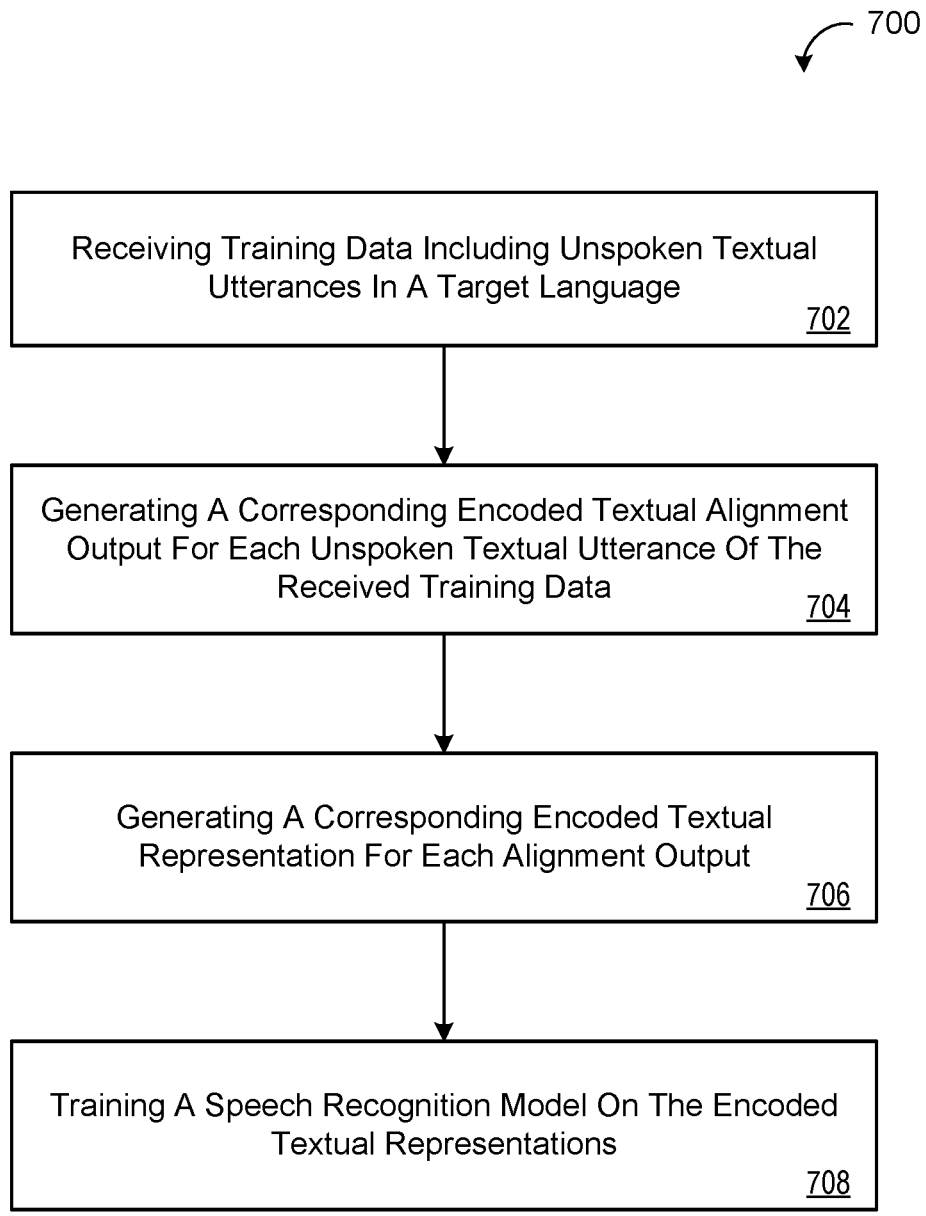
FIG. 7 is a flowchart of an example arrangement of operations for a method of using aligned text and speech representations to train speech recognition models without transcribed speech data.

FIG. 7 is a flowchart of an example arrangement of operations for a computer-implemented method 700 of using aligned text and speech representations to train automatic speech recognition models without transcribed speech data. The method 700 may execute on data processing hardware 810 (FIG. 8) using instructions stored on memory hardware 820 (FIG. 8) may reside on the user device 102 and/or remote computer/server 201 of FIG. 1 corresponding to a computing device 800 (FIG. 8).

At operation 702, the method 700 includes receiving training data including unspoken textual utterances 320 in a target language. Each unspoken textual utterance 320 not paired with any corresponding spoken utterance of non-synthetic speech (or synthetic speech). At operation 704, the method 700 includes generating a corresponding alignment output 402 for each unspoken textual utterance 320 of the received training data using an alignment model 400. The alignment model 400 is trained on transcribed speech utterances 304 in one or more training languages each different than the target language. That is, the alignment model 400 is trained on the training languages and generates the alignment outputs 402 for the unspoken textual utterances 320 in the target language that were unseen by the alignment model 400 during training. At operation 706, the method 700 includes generating, using a text encoder 202, a corresponding encoded textual representation 312 for each alignment output 402. At operation 708, the method 700 includes training a speech recognition model 200 on the encoded textual representation 312 generated for the alignment outputs 402 corresponding to the unspoken textual utterances 320 in the target language to teach the speech recognition model 200 to learn how to recognize speech in the target language. Notably, the only transcribed (i.e., paired) training data used to train the speech recognition model 200 to learn how to recognize speech in the target language is the transcribed speech utterances 304 in the one or more training languages, each of which is different than the target language, used to train the alignment model 400.

Figure 8:
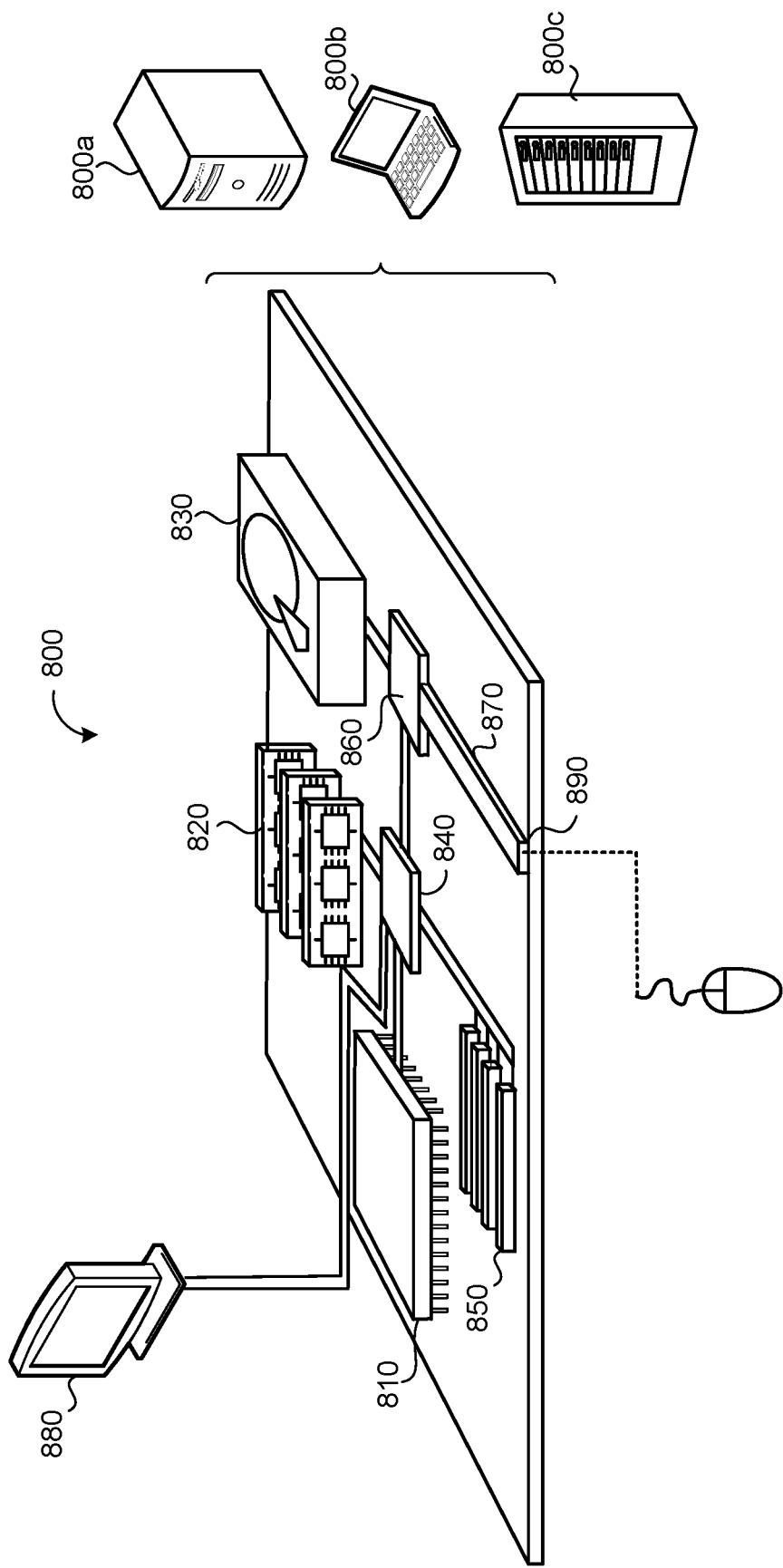
FIG. 8 is a schematic view of an example computing device that may be used to implement the systems and methods described herein.

FIG. 8 is a schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:
receiving training data comprising unspoken textual utterances in a target language, each unspoken textual utterance not paired with any corresponding spoken utterance of non-synthetic speech;

generating, using an alignment model, a corresponding alignment output for each unspoken textual utterance of the received training data, the alignment model trained on transcribed speech utterances in one or more training languages each different than the target language;

generating, using a text encoder, a corresponding encoded textual representation for each alignment output; and training a speech recognition model on the encoded textual representations generated for the alignment outputs corresponding to the unspoken textual utterances in the target language to teach the speech recognition model to learn how to recognize speech in the target language.

2. The computer-implemented method of claim 1, wherein training the speech recognition model comprises training the speech recognition model without using any transcribed speech utterances in the target language for supervised learning.

3. The computer-implemented method of claim 1, wherein the speech recognition model comprises an audio encoder and a decoder.

4. The computer-implemented method of claim 3, wherein the decoder comprises a recurrent neural network transducer (RNN-T) architecture.

5. The computer-implemented method of claim 3, wherein the audio encoder comprises:
the text encoder;
a speech encoder; and
a shared encoder.

6. The computer-implemented method of claim 3, wherein the audio encoder comprises a plurality of multi-headed self-attention layers.

7. The computer-implemented method of claim 3, wherein the audio encoder comprises a Conformer encoder.

8. The computer-implemented method of claim 3, wherein the operations further comprise conditioning at least one of the audio encoder or the decoder on a language identifier uniquely identifying the target language.

9. The computer-implemented method of claim 8, wherein conditioning the at least one of the audio encoder or the decoder comprises conditioning the at least one of the audio encoder or the decoder on the language identifier using residual adaptor layers.

10. The computer-implemented method of claim 1, wherein training the speech recognition model comprises:
for each alignment output, generating, using a shared encoder, a first encoded shared representation of the alignment output in a shared latent representation space;
for each transcribed speech utterance in the one or more training languages:
determining, using a speech encoder, an encoded audio representation of the transcribed speech utterance; and
generating, using the shared encoder, a second encoded shared representation of the transcribed speech utterance in the shared latent representation space,
wherein training the speech recognition model comprises training the speech recognition model on the first encoded shared representations generated for the alignment outputs corresponding to the unspoken textual utterances in the target language and the second encoded shared representation generated for the transcribed speech utterances in the one or more training languages.

11. The computer-implemented method of claim 1, wherein each unspoken textual utterance comprises a sequence of words, word-pieces, graphemes, and/or phonemes.

12. The computer-implemented method of claim 1, wherein the operations further comprise converting, using a pronunciation model, a script of the unspoken textual utterances in the target language into a phonetic representation shared across multiple languages.

13. A system comprising:
data processing hardware; and
memory hardware in communication with the data processing hardware, the memory hardware storing instructions that when executed on the data processing hardware cause the data processing hardware to perform operations comprising:
receiving training data comprising unspoken textual utterances in a target language, each unspoken textual utterance not paired with any corresponding spoken utterance of non-synthetic speech;
generating, using an alignment model, a corresponding alignment output for each unspoken textual utterance of the received training data, the alignment model trained on transcribed speech utterances in one or more training languages each different than the target language;
generating, using a text encoder, a corresponding encoded textual representation for each alignment output; and
training a speech recognition model on the encoded textual representations generated for the alignment outputs corresponding to the unspoken textual utterances in the target language to teach the speech recognition model to learn how to recognize speech in the target language.

14. The system of claim 13, wherein training the speech recognition model comprises training the speech recognition model without using any transcribed speech utterances in the target language for supervised learning.

15. The system of claim 13, wherein the speech recognition model comprises an audio encoder and a decoder.

16. The system of claim 15, wherein the decoder comprises a recurrent neural network transducer (RNN-T) architecture.

17. The system of claim 15, wherein the audio encoder comprises:
the text encoder;
a speech encoder; and
a shared encoder.

18. The system of claim 15, wherein the audio encoder comprises a plurality of multi-headed self-attention layers.

19. The system of claim 15, wherein the audio encoder comprises a Conformer encoder.

20. The system of claim 15, wherein the operations further comprise conditioning at least one of the audio encoder or the decoder on a language identifier uniquely identifying the target language.

21. The system of claim 20, wherein conditioning the at least one of the audio encoder or the decoder comprises conditioning the at least one of the audio encoder or the decoder on the language identifier using residual adaptor layers.

22. The system of claim 13, wherein training the speech recognition model comprises:

for each alignment output, generating, using a shared encoder, a first encoded shared representation of the alignment output in a shared latent representation space;

for each transcribed speech utterance in the one or more training languages: determining, using a speech encoder, an encoded audio representation of the transcribed speech utterance; and generating, using the shared encoder, a second encoded shared representation of the transcribed speech utterance in the shared latent representation space, wherein training the speech recognition model comprises training the speech recognition model on the first encoded shared representations generated for the alignment outputs corresponding to the unspoken textual utterances in the target language and the second encoded shared representation generated for the transcribed speech utterances in the one or more training languages.

23. The system of claim 13, wherein each unspoken textual utterance comprises a sequence of words, wordpieces, graphemes, and/or phonemes.

24. The system of claim 13 wherein the operations further comprise converting, using a pronunciation model, a script of the unspoken textual utterances in the target language into a phonetic representation shared across multiple languages.

* * * * *